(No Model.)
G. MADDEN.
SIGNAL LANTERN.
No. 391,808. Patented Oct. 30, 1888.
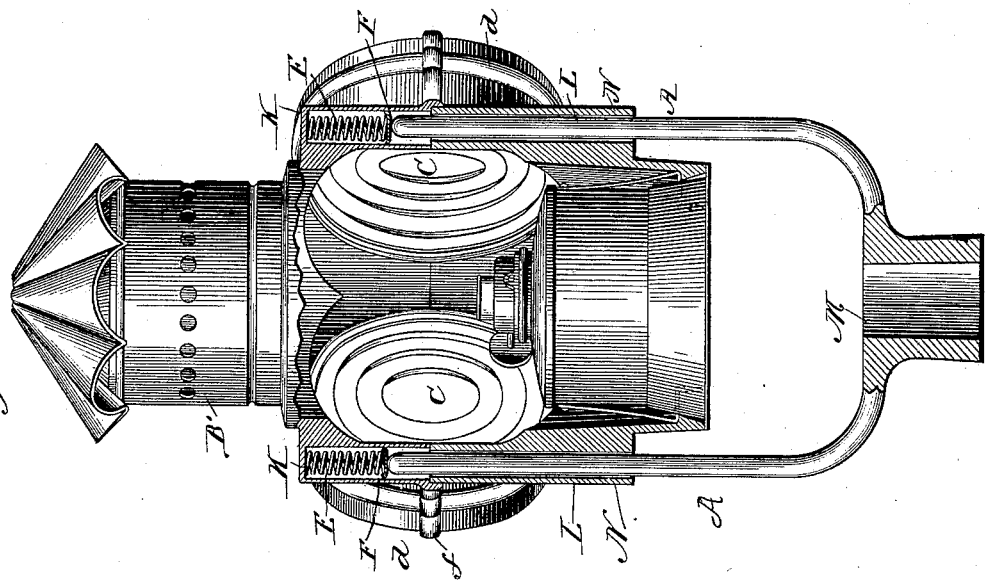
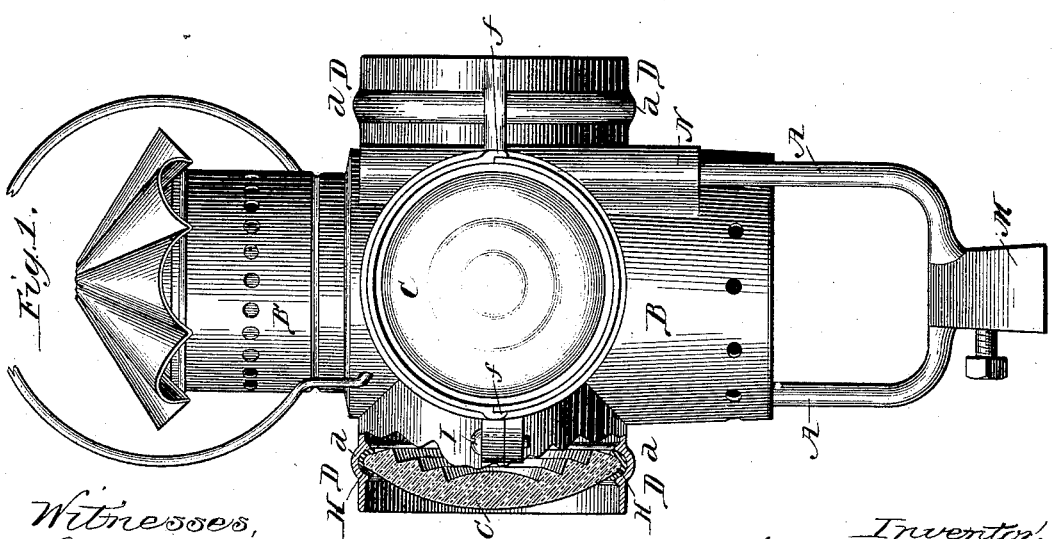
Witnesses,
W. Rossiter
J. J. Veeder
Inventor:
G. Madden
By J. H. Raymond
Atty.

ically useful in lanterns
UNITED STATES PATENT OFFICE.

GUSTAV MADDEN, OF CHICAGO, ILLINOIS, ASSIGNOR TO THE ADAMS & WESTLAKE COMPANY, OF SAME PLACE.

SIGNAL-LANTERN.

SPECIFICATION forming part of Letters Patent No. 391,808, dated October 30, 1888.

Application filed February 27, 1888. Serial No. 265,449. (No model.)

*To all whom it may concern:*

Be it known that I, GUSTAV MADDEN, of Chicago, in the county of Cook and State of Illinois, have invented certain new and useful Improvements in Signal-Lanterns, of which the following is a specification.

My invention is especially useful in lanterns which are used upon switch-stands, though it is adapted to other situations.

The object of my invention is to facilitate the construction and repair of the lantern, while increasing its strength and the security of its fastenings, so that the need of repairs will be less frequent.

Another object of my invention is to provide a spring-support for the lantern which shall prevent to a considerable extent the jar of passing trains from affecting the light.

My invention consists in the parts and combinations hereinafter described and claimed.

In the drawings, Figure 1 is a side view, partly in section, of my improved lantern. Fig. 2 is a section on the plane of the supporting-rods A A.

A A are two vertical rods, which are joined to a socket, M. The socket M may be attached to any pattern of rotating switch or signal. The lantern-body, preferably of cast metal, consists of two parts, B B, the line of division being situated in a horizontal plane at or near the center of the lens-opening D D, &c. Of the lens-opening D there may be any desired number, two or more. A depending flange, *f*, makes the joints between the parts B B tight, and screws I hold the said parts together.

Projections N N are cast on opposite sides of the lantern-body B B, and holes K L are bored through the lower and into the upper projections, so that they register with each other when the halves B B' of the lantern-body are brought together. The hole K in the upper half, B', is made slightly larger than the hole, L, in the lower half, B, and a spring, E, is inserted therein, a cap or plunger, F, being placed beneath the end of the spring. The diameter of the cap or plunger F is greater than that of the hole L, so that the spring E is kept in place thereby when the two halves B B' of the lantern-body are joined.

In the lens-openings D D are cast grooves *d*, in which the lenses C C are inserted. The lenses C C may be secured in place by a ring, of rubber, H, by putty, or other plastic substance, a tight joint being secured in most expeditious manner by inserting the plastic substance in the groove *d* and then closing the halves B B' upon the lenses C C.

The division of the lantern-body in two parts on a plane passing through the centers of the lenses thus allows a more secure and convenient way of fastening the lenses, and at the same time enables me to provide an enlarged chamber, K, for the insertion and retention of the spring E.

I claim—

1. In a signal-lantern, the combination of the horizontally-divided body formed with recesses in its sides, the springs located in said recesses, and the rod or frame upon which the lantern-body is supported, substantially as described.

2. In a signal-lantern, the combination of the horizontally-divided body, the two halves of which contain recesses registering with each other, the recess in the upper portion being of larger diameter than that in the lower portion, the springs, the caps, and the rods upon which the lantern is supported, substantially as described.

GUSTAV MADDEN.

Witnesses:
WARD W. WILLITS,
F. B. JONES.